United States Patent
Jager

(10) Patent No.: US 7,756,332 B2
(45) Date of Patent: Jul. 13, 2010

(54) METADATA EXTRACTION FROM DESIGNATED DOCUMENT AREAS

(75) Inventor: Jodocus Franciscus Jager, Nijmegen (NL)

(73) Assignee: OCE-Technologies B.V., Venlo (NL)

(*) Notice: Subject to any disclaimer, the term of this patent is extended or adjusted under 35 U.S.C. 154(b) by 1244 days.

(21) Appl. No.: 10/920,188

(22) Filed: Aug. 18, 2004

(65) Prior Publication Data
US 2005/0041860 A1 Feb. 24, 2005

(30) Foreign Application Priority Data
Aug. 20, 2003 (EP) ................ 03077643

(51) Int. Cl.
*G06K 9/34* (2006.01)
*G06K 9/00* (2006.01)

(52) U.S. Cl. ............... 382/173; 382/194

(58) Field of Classification Search ........... 382/173, 382/194
See application file for complete search history.

(56) References Cited

U.S. PATENT DOCUMENTS

| | | | | |
|---|---|---|---|---|
| 5,761,686 | A * | 6/1998 | Bloomberg | 715/234 |
| 6,323,876 | B1 | 11/2001 | Rao et al. | 345/634 |
| 6,353,823 | B1 * | 3/2002 | Kumar | 707/3 |
| 7,050,629 | B2 * | 5/2006 | Jackson et al. | 382/173 |
| 7,218,759 | B1 * | 5/2007 | Ho et al. | 382/118 |
| 2002/0085755 | A1 * | 7/2002 | Chi et al. | 382/176 |
| 2002/0188602 | A1 * | 12/2002 | Stubler et al. | 707/3 |
| 2003/0146915 | A1 * | 8/2003 | Brook et al. | 345/473 |
| 2003/0195883 | A1 * | 10/2003 | Mojsilovic et al. | 707/6 |
| 2004/0202349 | A1 * | 10/2004 | Erol et al. | 382/100 |
| 2007/0003138 | A1 * | 1/2007 | Hobson et al. | 382/173 |

FOREIGN PATENT DOCUMENTS

| | | |
|---|---|---|
| EP | 1 109 125 A2 | 6/2001 |
| EP | 1 136 938 A1 | 9/2001 |
| EP | 1 182 605 A1 | 2/2002 |
| EP | 1 256 900 A1 | 11/2002 |
| JP | 4-2768855 A | 10/1992 |
| JP | 7-73271 A | 3/1995 |
| JP | 8-166959 A | 6/1996 |
| JP | 9-128479 A | 5/1997 |
| JP | 2001-84332 A | 3/2001 |

OTHER PUBLICATIONS

William Newman et al., IEEE Comput. Soc., US, (Jun. 7, 1999), pp. 647-653.
Karin Sobottka et al., IEEE Comput. Soc, US, (Sep. 20, 1999), pp. 57-62.

* cited by examiner

*Primary Examiner*—Brian P Werner
*Assistant Examiner*—Michael Vanchy, Jr.
(74) *Attorney, Agent, or Firm*—Birch, Stewart, Kolasch & Birch, LLP

(57) ABSTRACT

A method and device are described for extracting metadata from an image of pixels, such as a title or author of a document. At least part of the image is shown on a display for a user. A pointing control element in a user interface, such as a mouse or a touch screen, is operated by a user to generate a selection command. The selection command includes a selection point in a metadata element in the image. A region of foreground pixels is determined, the region containing pixels that are connected to the selection point. An extraction area is constructed around the region. Finally metadata is extracted by processing pixels in the extraction area.

39 Claims, 5 Drawing Sheets

METADATA EXTRACTION FROM DESIGNATED DOCUMENT AREAS

Figure 1:
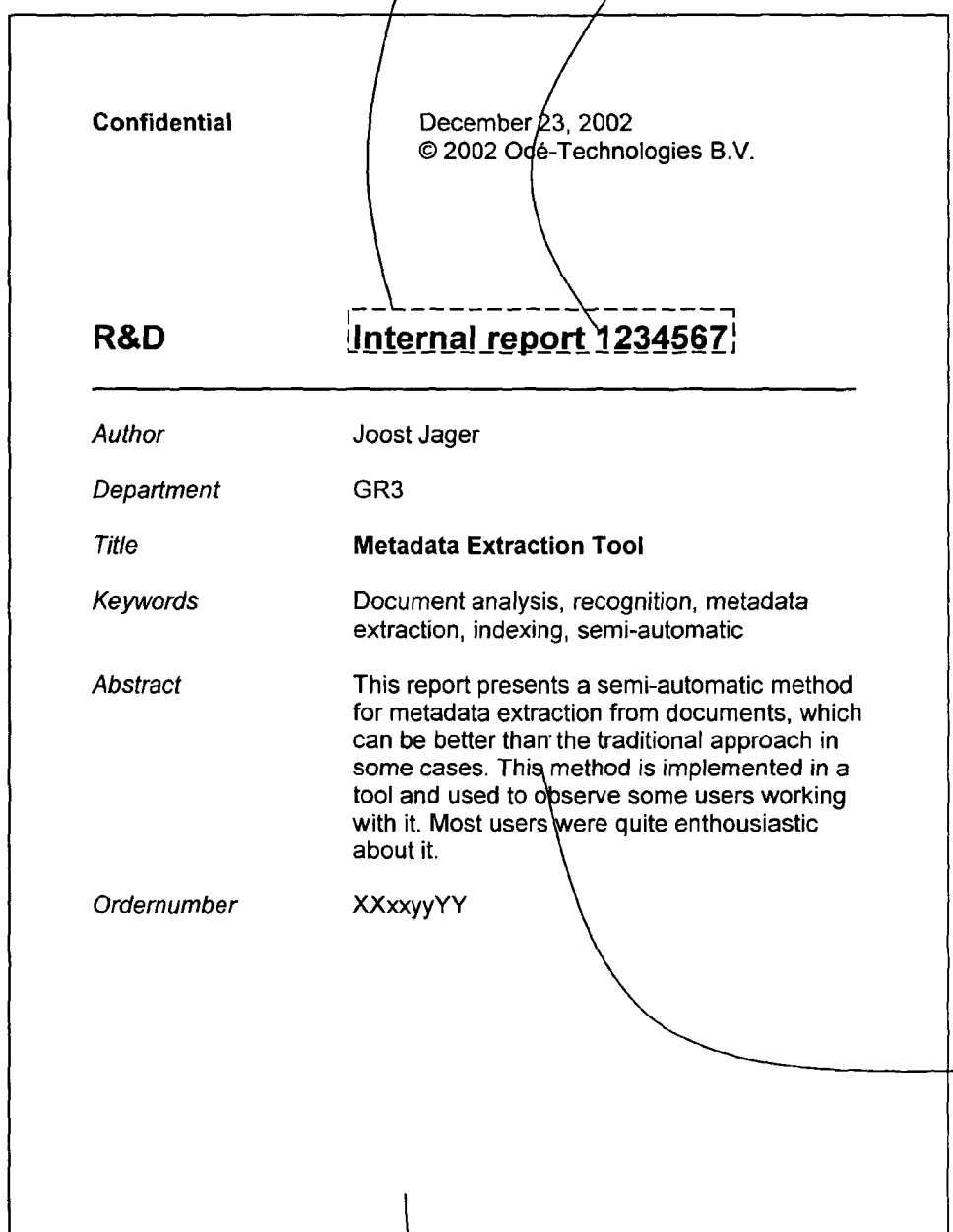

The present application claims, under 35 U.S.C. §119, the priority benefit of European Patent Application No. 03077643.9 filed Aug. 20, 2003, the entire contents of which are herein fully incorporated by reference.

BACKGROUND OF THE INVENTION

1. Field of the Invention

The invention relates to a method of and a device for extracting metadata from a document image of pixels, the pixels having a value representing the intensity and/or color of a picture element. The invention further relates to a computer program product.

2. Discussion of the Background Art

In environments where large numbers of digital documents are processed, there is often a need to generate descriptive data that can be associated with a document in order to facilitate further handling. Such descriptive data, further to be called "metadata", may comprise any data describing the document, e.g. a title, an author, a document type, a keyword, an abstract of the contents, etc.

The metadata may, e.g. be used as entries for retrieving documents stored in a database. Also, they may be used in generating file names in scanning applications, and in many other situations.

Metadata may be composed by human operators, who read the document and describe it in a few meaningful words. This is a sophisticated, yet extremely time-consuming way of generating metadata. In many instances, however, metadata that can be used are already contained in the document itself, e.g. the title, the author, etc., and it would often be completely acceptable to use one of these as a descriptive token.

When documents are in digitally encoded form, such as MS WORD™ documents, they can be automatically indexed by dedicated programs that scan the document and extract preprogrammed keywords. However, documents that are available as images, i.e. compositions of black (coloured) and white pixels, must first be converted into digitally encoded form by OCR, a process that needs much computing power and yet does not always work properly. Also the indexing program takes quite some time to process a document.

Automatically interpreting document images is known for heavily structured documents, such as patent documents. Such documents have a strictly prescribed form and a computer can be programmed for finding and processing particular predetermined information items in the document image. Free form documents, however, cannot be processed in this way.

Human operators have the advantage that they can easily oversee a document image and find relevant items in it. It would thus be advantageous to let an operator select metadata in the document image, that are then automatically extracted and associated to the document by a computer system.

A method and device for extracting metadata from a document are known from European Patent Application Publication No. EP 1136938. According to the method discussed in that reference, documents are first scanned to generate an image of pixels using a scanner connected to a computer. The scanned documents according to the reference have a structured layout in which text strings representing metadata are positioned in boxes, which boxes enclose the text strings by drawn lines. In particular technical drawings have such boxes containing metadata such as titles, dates, versions, etc. The user operates a pointing member of the computer to designate an arbitrary point in at least one box of the documents. After designating the point by the user, the box containing the point is identified by detecting the surrounding lines. Subsequently the characters in that box are recognized by optical character recognition (OCR) so as to retrieve the metadata and store it in a database connected to the computer to enable documents scanned in this way to be indexed. Hence the boxed structure of the metadata is assumed for identifying the metadata. The problem of this method, however, is that the method can only extract metadata from documents that have structured boxes containing the metadata text strings.

In another known system for entering digital documents into a database and extracting metadata for retrieval purposes, as disclosed in European Patent Application Publication No. EP 1256900, an operator must draw an "envelope" around the metadata item in the image with a mouse or the like. Then, the system converts the bitmap image information contained in the envelope into text format by OCR. However, the operator designates the extraction area, which requires careful operation, and even then errors may readily be made by imprecise mouse movements.

SUMMARY OF THE INVENTION

It is an object of the invention to provide a method and device for extracting metadata from documents without requiring metadata to be contained in structured boxes or externally defined area delimiters.

It is another object of the invention to provide a method and device for extracting metadata from documents, which overcome the limitations and problems of the related art.

According to a first aspect of the invention, there is provided a method for extracting metadata from a document image of pixels, comprising displaying at least part of the image on a display screen for a user; receiving a selection command from a user, the selection command comprising an indication of a selection point in a metadata element in the image; automatically classifying pixels as foreground pixels based on their values having a foreground property; automatically determining an extraction area within the image based on foreground pixels connected, with respect to a connection distance, to a foreground pixel indicated by the selection point; and extracting the metadata by processing pixels in the extraction area.

According to a second aspect of the invention, there is provided a device for extracting metadata from a document image of pixels, comprising an input unit for receiving the image; a display for displaying at least part of the image for a user; an interfacing unit for receiving a selection command from the user, the selection command comprising a selection point in a metadata element in the image; and a processing unit for classifying pixels as foreground pixels based on the values having a foreground property, for determining an extraction area within the image based on foreground pixels connected, with respect to a connection distance, to a foreground pixel indicated by the selection point, and for extracting the metadata by processing pixels in the extraction area.

According to a third aspect of the invention, there is provided a computer program product for performing the method of the present invention.

Via a user interface, such as a touch screen or a mouse, the user indicates a selection point in the metadata element he intends to have extracted. A first foreground pixel is found indicated by the selection point, i.e. the foreground pixel corresponding to the location of the selection point or close to the selection point if the selection point is on a background pixel in the metadata element. An extraction area corresponding to the metadata element is then constructed by, starting at the indicated first foreground pixel, connecting foreground pixels to that first foreground pixel. A connection distance is introduced for ignoring insignificant background pixels, so to ascertain that an extraction area may span a full word, irrespective of the inter-character spaces.

Then the extraction area is determined, based on the connected region. The advantage of the extraction area is that it is based only on the metadata element itself, usually a text element. No predefined structure in the image like a box around the text is needed to guide the metadata extraction process.

In an embodiment of the method, the process of determining the extraction area comprises automatically generating a connected region by: including the foreground pixel indicated by the selection point, progressively including further foreground pixels that are within the connection distance from other foreground pixels included in the connected region, and setting the extraction area to an area completely enclosing the connected region. This has the advantage that growing the connected region based on the connection distance is a robust and easy way of calculating an estimate for the extraction region. It is to be noted that the extraction area usually will have parallel sides, but need not be rectangular. In text documents a rectangular shape will be most practical, but in larger text fragments the shape of the extraction area may be adapted. For symbols or graphical elements a different shape of the extraction area may be used.

In an embodiment of the method, the process of generating the connected region comprises setting the connection distance in dependence of a connection direction, in particular the connection direction being a horizontal, vertical or an assumed reading direction. By setting the connection distance to a value that bridges the distance between expected metadata elements, such as characters in a word, or words in a sentence, the extraction area will be covering metadata elements likely intended to be indicated by the user. By assuming or deriving a reading direction the method allows the user to easily indicate the beginning of a text fragment in a larger text section, because the growing will connect text elements in said reading direction.

In a further embodiment of the method, the input document image is first converted to a lower resolution and the steps of classifying pixels and of determining an extraction area are preformed on the lower resolution image. This has the advantage that less computing power is required, while a moderate lowering of the resolution does normally not decrease the accuracy of the method.

In an embodiment of the method, the process of determining the extraction area comprises displaying a proposed extraction area. This has the advantage that the user has a visual feedback of the calculated extraction area.

In another embodiment, the method further includes receiving a supplement to the selection command, for adapting the connection distance. This has the advantage that the user can easily confirm, reject or change the proposed extraction area.

In a further embodiment, the method further comprises automatically adapting the connection distance in response to the supplement to the selection command, wherein the supplement to the selection command comprises the user indicating a further selection point. The user controls the connection distance by indicating the further point to be connected. This has the advantage that the user can intuitively extend the extraction area to the required size.

In yet a further embodiment, the method further comprises automatically adapting the connection distance in dependence of a selection direction received via the supplement to the selection command, said selection direction being defined by the user dragging a selection item on the display screen. The user controls the connection distance by dragging a pointer like a mouse controlled cursor. This has the advantage that the user can intuitively extend the extraction area to the required size.

In still another embodiment of the method, the determining of the extraction area further includes adjusting the proposed extraction area on a user command. This has the advantage that the user can easily select the metadata elements. For example, adjusting the shape of the extraction area comprises providing controllable elements of the proposed extraction area, in particular sides and/or edges, and receiving as the supplement a dragging command from the indicating means for moving one of the controllable elements. By moving the controllable elements the user can easily adapt the shape of the extraction area. Alternatively, adjusting the shape of the extraction area comprises increasing or decreasing the size of the extraction area via a supplementary user control event such as clicking a mouse button or operating a mouse wheel. By clicking, the size may increase by a predetermined amount, e.g. by increasing the connection distance, such that a larger extraction area is displayed. A mouse wheel or similar continuous control mechanism my gradually change the size. By adapting the connection distance in a text document the size of the extraction area may visually increase from containing one word to a sentence or paragraph.

In an embodiment of the method, the selection command comprises a supplement for assigning a metadata type to the extracted metadata. This has the advantage that the user can directly control the metadata type to be assigned. A good way of enabling a user to give such a supplement command is by displaying at least one control item, in particular a button or a drop down menu, for the user to select a metadata type.

Alternatively the system may assume or enforce a predetermined order of entering different types of metadata, which increases the speed of use. The system may be learning the order of entering from the preferences of the user.

In an embodiment of the method, the extracted metadata and assigned types may be entered into a database as indexing data for a document. This has the advantage that documents can be retrieved from the data base on the basis of the extracted metadata.

In an embodiment, the method comprises extracting as metadata a text string, and assigning the text string to constitute a name for a file or message containing the image. Traditionally during scanning, file names are automatically assigned, e.g. a sequence of numbers, or manual input is required. By using the metadata a name connected to the document itself is generated. A file name based on metadata makes retrieving a file easier. Also, a scanned file may be sent by e-mail, e.g. as an attachment. The metadata extracting process according to the invention may well be used to generate a "subject" for the e-mail message, such that the content is easily recognized.

In this description, a "document image" may be understood as comprising a set of images of individual physical document pages. In general, the part of the document shown on the display is the first page image, since normally that is the page containing the most relevant information for metadata extraction. It is, however, contemplated by the inventors to provide the apparatus with a browsing function to navigate through the entire document image, that is, through the set of physical document page images.

Further preferred embodiments of the device according to the invention are given in the further claims.

BRIEF DESCRIPTION OF THE INVENTION

Figure 2:
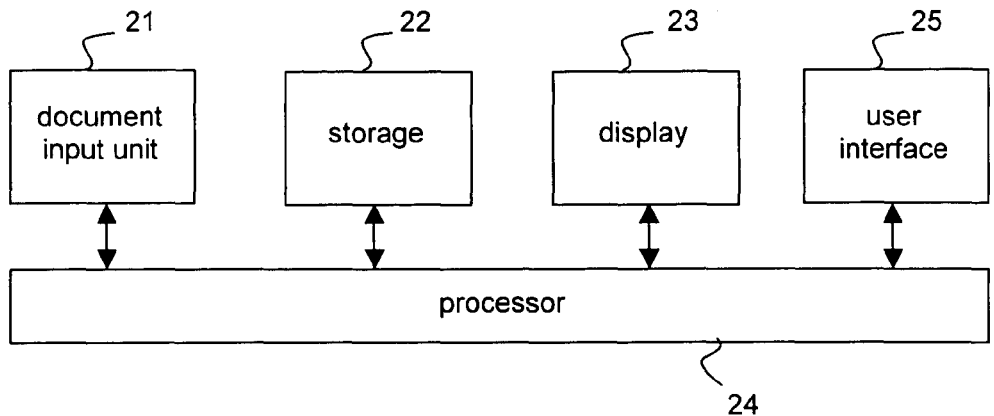
Figure 7:
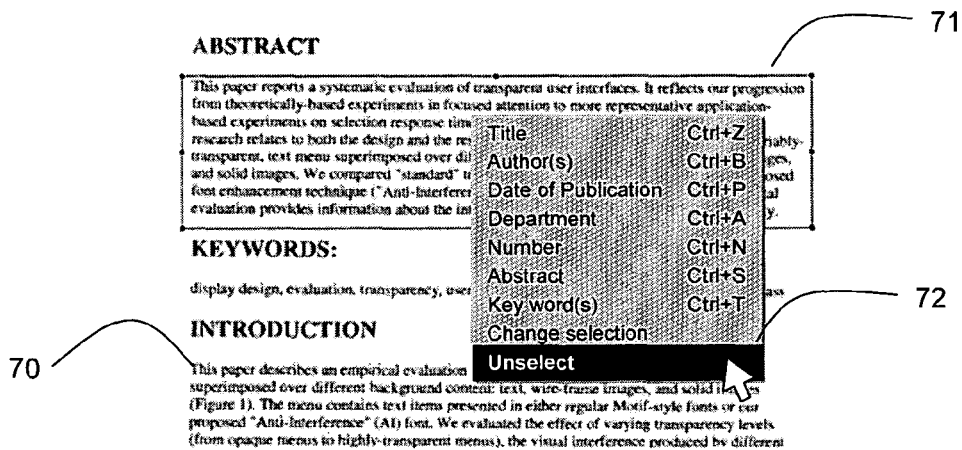
Figure 3:
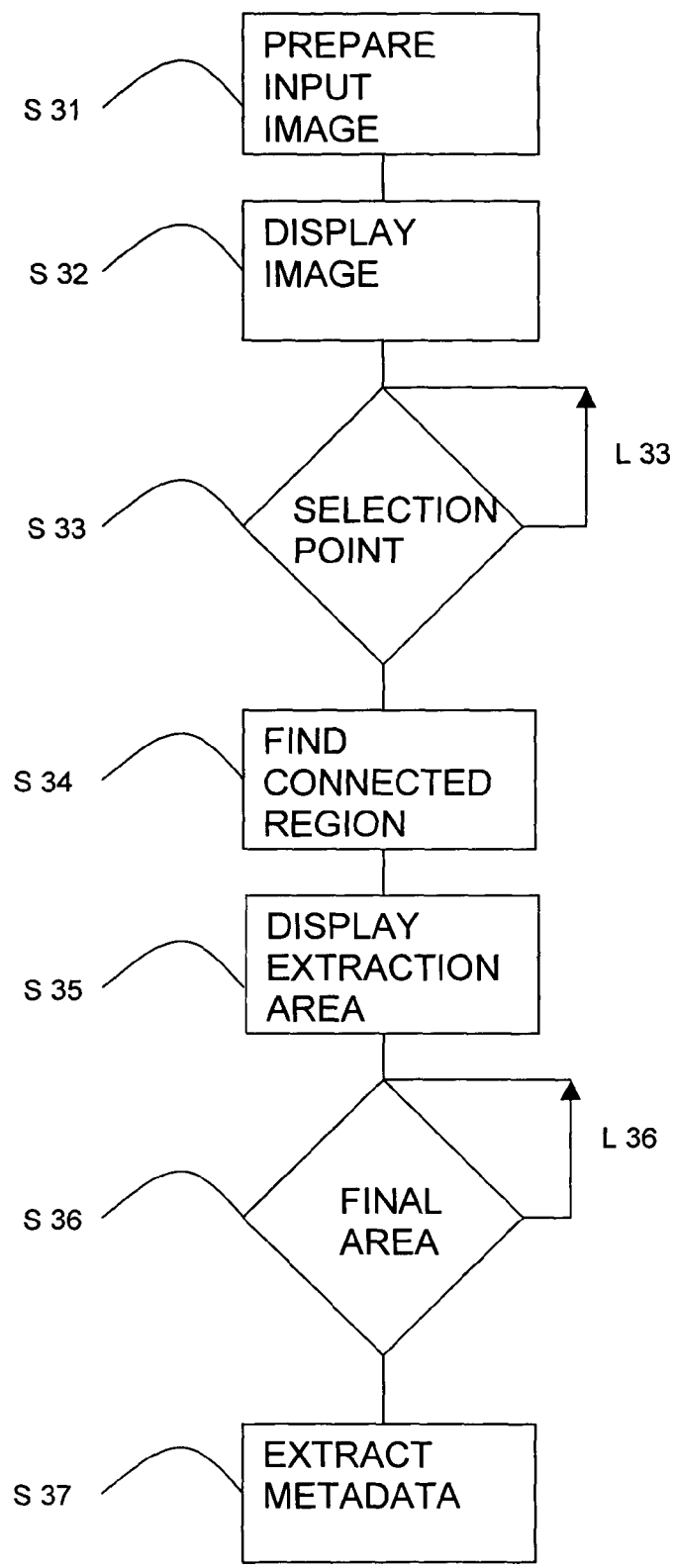
Figure 4A:
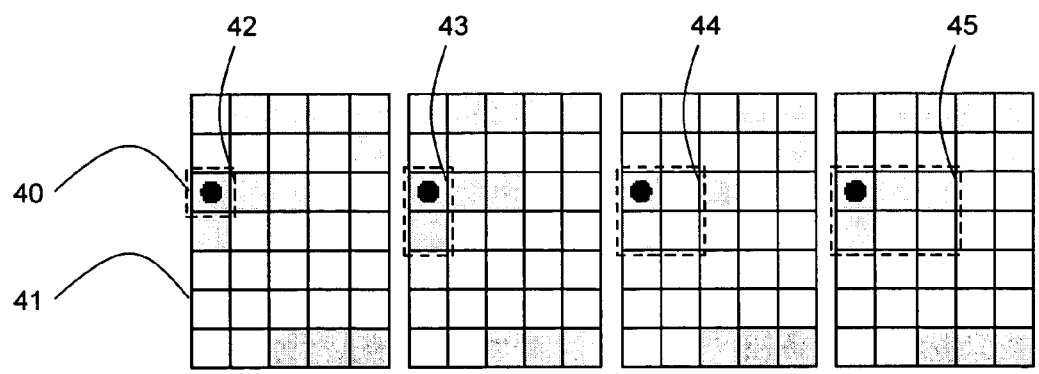
Figure 4B:
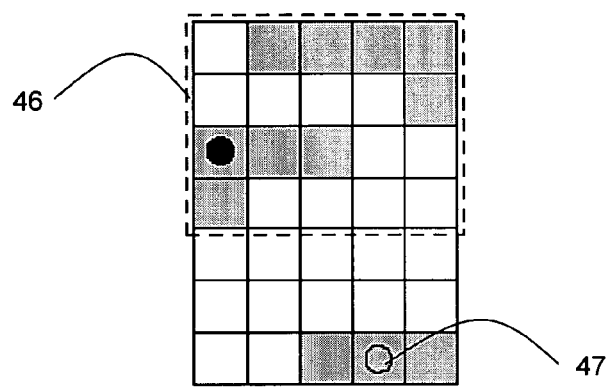
Figure 4C:
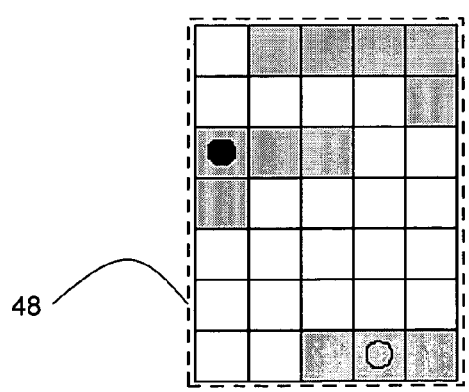
Figure 5:
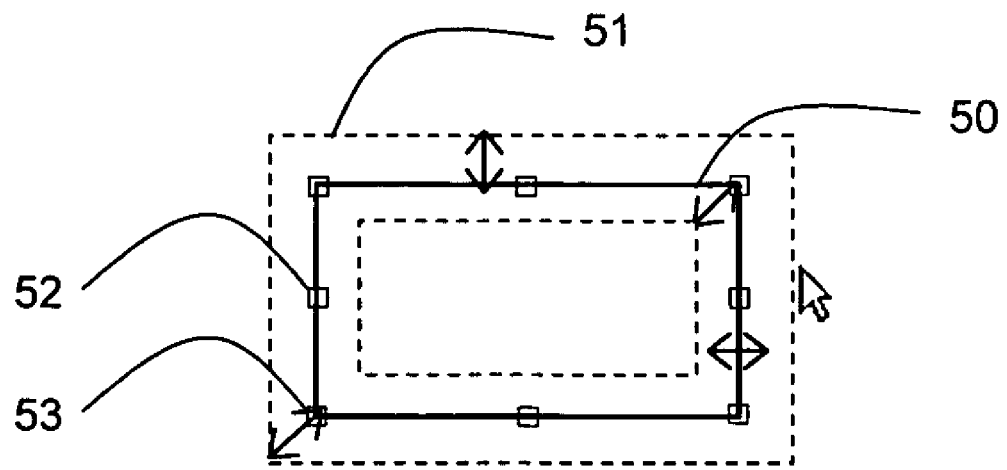
Figure 6:
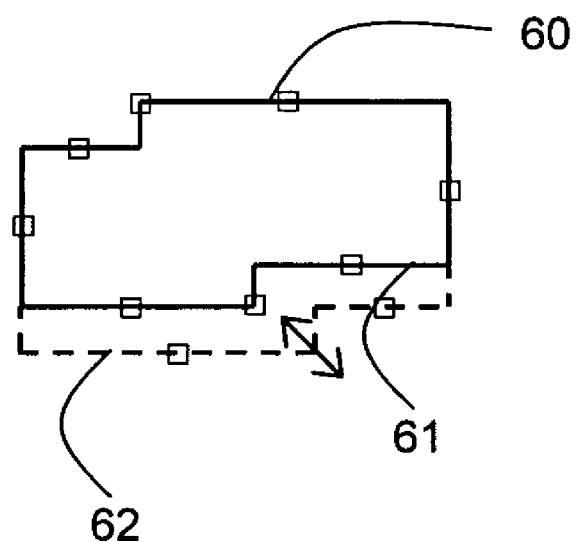

These and other aspects of the invention will be apparent from and elucidated further with reference to the embodiments described by way of example in the following description and with reference to the accompanying drawings, in which FIG. 1 shows an example of a scanned document image and a metadata extraction area, FIG. 2 shows a device for processing a document and extracting metadata according to an embodiment of the present invention, FIG. 3 shows a method for extracting metadata according to an embodiment of the present invention, FIGS. 4a-4c show growing a region from a selection point according to an embodiment of the present invention, wherein FIG. 4a shows region growing with a connection distance of one pixel, FIG. 4b shows region growing with a connection distance of two pixels, and FIG. 4c shows region growing with a connection distance of three pixels, FIG. 5 shows an example of adapting a metadata extraction area according to an embodiment of the present invention, FIG. 6 shows an example of adapting the shape of a non-rectangular extraction area according to an embodiment of the present invention, and FIG. 7 shows a display of an image, an extraction area and a menu.

The figures are diagrammatic and not drawn to scale. In the figures, elements which correspond to elements already described have the same reference numerals.

DETAILED DESCRIPTION OF THE PREFERRED EMBODIMENTS

FIG. 1 shows an example of a scanned document image and a metadata extraction area according to an embodiment of the present invention. As shown in FIG. 1, a document 13 has been scanned to generate an image of pixels. The pixels (short for picture elements) are a numerical representation of the document, and have values representing the intensity and/or color of the picture elements. A part of the image is shown on a display 12 (schematically drawn) for a user to interactively determine metadata.

An image file of a document may contain separate images for each page of the document. A title page, usually the first page, contains relevant information about the contents of the document, such as title, document type author, publication date, etc. Such information is called metadata in this description. The user may have the option to manipulate the display for showing the relevant part of the image or image file, e.g. by scrolling. Alternatively the display may show a full page of a single page document.

An example of a metadata element is a document number 11, which is part of the type of the document. The metadata element may be a single word, such as the document number 11, or may be one or more text lines. For example the abstract shown in FIG. 1 contains about 6 lines of text.

On the display 12 an extraction area 14 is shown around the document type including the document number 11. The extraction area is an area of the image that is to be used by a processing unit for finding the metadata, and recognizing the metadata. Usually the metadata is a text, and the extraction area is analyzed for recognizing the characters and words, which is commonly known as optical character recognition (OCR). The metadata may also be specific picture elements, such as symbols or logos, which can be categorized for use as metadata.

For constructing the extraction area, the user first indicates a selection point in the metadata element that he considers relevant, for example the document number 11. Indicating the selection point is the first step in a selection command. For indicating the selection point the display may be accommodated on a sensitive screen such as a touch screen. The user may indicate the selection point using a finger, or using a dedicated pointing stick or stylus. Alternatively the display may show a cursor that is controlled by the user, e.g. by a mouse, trackball or the like. The selection point may then be indicated by positioning the cursor and activating a button, such as a mouse click.

The processing unit then analyzes the pixels near the selection point to find pixels that are part of the metadata element as described in detail below. Pixels are classified as foreground pixels based on the values having a foreground property, usually the value representing black on a white background document. In a color image, the foreground property may be the value representing a specific color, e.g. a color interactively determined from the color of the pixel indicated by the selection point, or a color different from the background color. Methods for distinguishing foreground and background pixels are well-known in the art, e.g. European Patent Application Publication No. EP 1 182 605 A.

A first foreground pixel is found indicated by the selection point, i.e. the foreground pixel corresponding to the location of the selection point or close to the selection point if the selection point is on a background pixel in the metadata element. If the selection point is on a background pixel within a predefined distance of foreground points, the system may consider the indicated pixel as a foreground pixel for the purpose of finding pixels constituting the intended metadata element, i.e. (re-)classify the selection point as a foreground pixel due to the fact that it has been indicated by the user. Alternatively, the system may select the closest foreground pixel as selection point. If the selection point is on a background pixel far away from foreground points, the system may consider this selection as a command to cancel a currently selected metadata extraction area.

Based on the first foreground pixel, a region of pixels is detected and assumed to be part of metadata, and an extraction area is drawn around the region and displayed to the user. Metadata is extracted by processing pixels in the extraction area.

In an embodiment of the present invention, a single type of metadata is detected, for example, text to be used for constituting a file name for the scanned document. The file name may be generated automatically after the user has indicated the selection point. Alternatively the recognized metadata and/or the proposed file name may be displayed for the user and a confirmation command may be required for finally accepting the metadata.

FIG. 2 shows a device for processing a document and extracting metadata according to an embodiment of the present invention. As shown in FIG. 2, the device has an input unit 21 for entering a digital image. The input unit 21 may comprise a scanning unit for scanning an image from physical documents such as an electro-optical scanner, and/or a digital communication unit for receiving the image from a network such as a local area network (LAN) or Internet, and/or a playback unit for retrieving digital information from a record carrier such as an optical disc drive. The input unit 21 is coupled to a processing unit 24, which cooperates with a storage unit 22. The storage unit 22 may include a recording unit for storing the image and/or metadata on a record carrier such as a magnetic tape or optical disk. The processing unit 24 may comprise a general purpose computer central processing unit (CPU) and supporting circuits that operate using software for performing the metadata extraction as described above.

The processing unit 24 is coupled to a user interface 25 provided with at least a pointing unit for indicating a selection point on the image. The user interface 25 may include controllers such as a keyboard, a mouse device or operator buttons. The processing unit 24 is coupled to a display unit 23. The display unit 23 comprises a display screen for displaying the image and the extraction area as explained above with FIG. 1. In particular the display unit 23 and the pointing unit may be embodied by a touch screen sensitive to the user pointing to the metadata element in the displayed image with a finger for indicating the selection point. The processing unit 24 may be coupled to a printing unit for outputting a processed image or metadata on paper. The extracted metadata may be stored with the image in a database, for example in the storage unit 22 or in a separate computer system.

It is noted that the present device may be constructed using standard computer hardware components, and a computer program for performing the metadata extraction process as described below. Alternatively the device may be a dedicated hardware device containing a scanning unit, a processing unit and a display to accommodate the metadata extraction. Furthermore the scanning process may be detached from the interactive process of metadata extraction, e.g. a scanning unit in a mail receiving room may be coupled via a LAN to an indexing location having the display and operator.

FIG. 3 shows a method for extracting metadata according to an embodiment of the present invention. This method can be implemented by the device of FIG. 2 or any other suitable device/system. Referring to FIG. 3, in a first step PREPARE INPUT IMAGE S31, the image is received, e.g. from a scanning device, as a digital file of pixel values. The step S31 may include additional image processing based on predetermined knowledge or detected properties of the image, such as enhancing the contrast, determining foreground and or background properties from global statistics of the image, rotating the image, etc. Also, the step S31 may include preparing an additional input image having a lower resolution for use in the image analysis of the step S34 (to be explained below). Since the scanned image has a fairly high resolution, a moderate lowering of the resolution, e.g. with a factor 2 to 4, will normally not worsen the analysis, while it reduces the required processing power. The original high resolution input image will still be used for the display and data extraction purposes.

In the next step DISPLAY IMAGE S32, the image is shown to a user on a display. The step S32 may include finding a relevant part of the image to display, e.g. from a page starting with a large white area displaying the part that has the first text lines. In the next step SELECTION POINT S33, a user action is expected to indicate a selection point in the image, in particular in a metadata element. A symbolic waiting loop L33 in the drawing indicates that the system waits for a user action.

In the next step FIND CONNECTED REGION S34, the pixels around the selection point are analyzed to find the foreground pixels which are within a connection range as explained below with FIG. 4. In the next step DISPLAY EXTRACTION AREA S35, an extraction area is displayed that covers the connected region. The extraction area may be shown as a rectangular area just containing the connected region, a highlighted area, or any other suitable display feature. The extraction area may also be adapted to the type of metadata, such as a boundary on words in a larger text fragment as described with reference to FIG. 6.

It is noted that the user may actively enter a selection point, e.g., by clicking a mouse button when the cursor is on the desired metadata element, or by putting a finger on a touch screen. However, the system may also automatically display a proposed extraction area as soon as the user positions a pointer element (such as a cursor) near a foreground object or after a predetermined (short) waiting time. In the automatic mode the steps SELECTION POINT S33, FIND CONNECTED REGION S34 and DISPLAY EXTRACTION AREA S35 are combined. The cursor may be shown as a specific symbol indicating the automatic mode, e.g. by adding a small rectangle to the cursor symbol. The user can determine the selection point based on the visual feedback of the proposed extraction area.

Based on the displayed extraction area, the user can verify that the extraction area covers the metadata elements that he intended. In the next step FINAL AREA S36, the user confirms the displayed extraction area, e.g. by a mouse command or implicitly by entering the next document.

The user may also, as shown with a symbolic loop L36, adapt the proposed extraction area as explained with FIG. 5 or 6. For example the user may indicate a second point that must also be included in the extraction area, or the user indicates an extension of the proposed extraction area by dragging the pointing element from the selection point in a direction that he intends to extend the extraction area. The display may show the final area in response to the adaptation.

In the next step EXTRACT METADATA S37, the finally confirmed extraction area is processed to detect and recognize the metadata elements, such as words via OCR. The result may be shown on the display in a text field. The EXTRACT METADATA step S37 may include receiving a supplement to the selection command, in which the user indicates a specific metadata type to be assigned, such as 'title', 'author[1], 'abstract', etc. For example the user may activate a specific button for entering metadata in the extraction area as the title of the document.

FIGS. 4a, 4b and 4c show growing a region from a selection point according to an embodiment of the present invention. The user indicates the selection point in the image, and then a region is formed as follows. A starting foreground pixel is selected at the selection point. If the selection point is on a background pixel, but within a predefined distance from a foreground pixel, that foreground pixel may be used as a starting pixel.

Particularly, FIG. 4a shows an example of region growing with a connection distance of one pixel. A detailed part of an image 41 is shown in four region growing phases, individual pixels showing as white (background) or grey (foreground). In the example, the user has indicated a selection point 40 indicated by a black dot. The region growing starts at the pixel corresponding to the selection point 40, and initially a starting region 42 of just one pixel is shown. The connection distance for the growing is assumed to be one pixel, i.e. no intermediate background pixels are allowed. In the second growing phase, a second region 43 is shown as extending downwardly to include the directly connected pixels. In a third growing phase, a third region 44 is shown as extending to the right to include the directly connected pixels. In a fourth growing phase, a fourth region 45 is shown as extending again to the right to include the directly connected pixels. As no further foreground pixels are within the connection distance (=1), the region growing stops. It is to be noted that a rectangular area is drawn as a dashed line around the growing regions 42, 43, 44 and 45. The area includes also background pixels. After finalizing the region growing process, the drawn area can be the proposed extraction area.

FIG. 4b shows an example of region growing with a connection distance of two pixels. The same detail of an image as in FIG. 4a is shown. Here, the connection distance is increased to 2 pixels, and therefore single intermediate background pixels will be bridged. The resulting rectangular area 46 contains the foreground pixels having a connection distance of two. The user may confirm the resulting area, or may decide that the rectangular area is too small. In that case the user supplements his selection command. Thereto the user may indicate a second selection point 47 in a further foreground part of the image, for example by pointing to the new location or dragging from the selection point 46 to the second selection point 47. The supplement to the selection command is translated by the processing unit 24 into a larger connection distance that is just suitable for adding the second selection point 47 to the selection area. This may result in the selection area being enlarged in other directions as well.

In an embodiment the user may click or point to the same location repeatedly for increasing the connection distance.

FIG. 4c shows an example of region growing with a connection distance of three pixels. The same detail of an image as in FIG. 4b is shown. Here, the connection distance is increased to 3 pixels, and therefore up to two intermediate background pixels will be bridged. The resulting rectangular area 48 contains the second selection point 47. It is to be noted that the region growing process may also be adapted to the results achieved, or may include learning options, e.g. using a larger connection distance if the user in most cases needs to increase the region. Also, if a connected region below a predetermined size is found, the process may include increasing the connection distance automatically to achieve at least the predetermined size.

In a further embodiment of the region growing process, the connection distance is different for different directions. For example, the connection distance in the horizontal direction may be larger then the connection distance in the vertical direction. For common text documents, this results in robustly connecting words in a text line, without connecting the text line to the next or previous line. In a preprocessing step, a reading direction may be determined, e.g. by analyzing the layout of background pixels. The connection distance may be based on the reading direction, e.g. left to right, and from the selection point to the right, the connection distance may be larger.

In an embodiment of the region growing process, the connection distance is adapted in dependence of a selection direction received via the supplement to the selection command. The proposed extraction area is displayed for the user, and the user will easily detect that the extraction area is to be extended in a specific direction. The user may indicate the selection direction by dragging a selection item (cursor, or a finger on a touch screen) from the selection point in the selection direction. It is noted that the increase of the connection distance may be derived from the distance of the dragging from the first selection point.

In addition to the control over the extraction area based on region growing, the present device may provide further options for adapting the extraction area. For instance, selecting the extraction area may comprise adapting the shape of the extraction area via the supplement to the selection command as follows.

FIG. 5 shows adapting a metadata extraction area according to an embodiment of the present invention. Referring to FIG. 5, initially a rectangular extraction area 50 is displayed to the user. The shape of the extraction area 50 can be changed by controllable elements 52,53 of the proposed extraction area. The user gives a supplement to the selection command by moving one of the controllable elements 52,53. The controllable elements 52,53 are displayed to the user by additional symbols, e.g. small squares added to the sides and edges of the extraction area 50. The user can for example drag the upper side of the extraction area 50. The result may be just extending the extraction region upwards using the controllable elements 52,53. By manipulating the controllable element 53, the corresponding left and lower sides are moved. Possible new positions of sides and edges may be displayed as dashed lines 51 during manipulation. After finally selecting the area, the new position of sides and edges will be shown as solid lines. It is noted that other visual elements may be applied for displaying the control options, such as colors, blinking, etc.

In an embodiment, all 4 sides may be extended or decreased simultaneously, e.g. by manipulating a dedicated symbol. The shape of the extraction area may be adapted by increasing or decreasing the size of the extraction area via a supplementary user control event such as clicking a mouse button.

FIG. 6 shows adapting the shape of a non rectangular extraction area according to an embodiment of the present invention. Referring to FIG. 6, an extraction area 60 is shown which is constructed to select part of a text fragment. The selection starts at a word in the middle of a line, and ends also in the middle of a line. A column layout of the text is assumed as an example. Vertical sides may be easily detected, and may even be non controllable by the user. The bottom line 61 has two horizontal parts and an intermediate vertical part. The bottom line 61 may be dragged and extended to a new position 62 indicated by a dashed line. In particular the intermediate vertical part can be dragged to a location in the text lines after the last word to be included in the metadata.

After finally setting the extraction area, the metadata can be extracted and processed by OCR (Optical Character Recognition). The user may assign a type of metadata, e.g. by operating a button or selecting a menu option as shown in FIG. 7 as explained below. The extracted metadata and assigned types are entered into a data base, and can be used for indexing, and/or recognizing the documents in the database.

In an embodiment, setting the extraction area and extracting the metadata is used for determining a file name to attach to a scanned document. The extraction area may be proposed using the requirements of a file name, e.g. having a minimum and maximum length. The extraction process may include adapting the text string to be in conformity with file naming rules, such as eliminating forbidden characters and preventing using the same file name again. Further identifying data such as a date or time may be added. A scanned document may be stored automatically using the constituted file name.

FIG. 7 shows an example of a display of an image, an extraction area and a menu. Referring to FIG. 7, an image 70 of a scanned document is displayed for a user. An extraction area 71 has been selected, in particular a text fragment deemed to be an 'abstract' has been enclosed in the extraction area 71. The user has confirmed the extraction area and now a control item is displayed, for example a drop down menu 72 activated by a click on the right mouse button. The menu 72 provides several types of metadata that can be assigned, in addition to other commands such as canceling the selection. Also shortcut commands may be provided by using the <Control> key on a keyboard. Selecting the metadata type concludes the interactive process of metadata extraction. The metadata can now be made available for further processing, e.g. storing in a database.

The processing steps of the present invention are implementable using existing computer programming language.

Such computer program(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

Although the invention has been mainly explained by embodiments using text elements representing the metadata in the digital image, the invention is also suitable for any representation of metadata information such as symbols, logos or other pictural elements that can be categorized, such as portraits. It is noted, that in this document the use of the verb 'comprise' and its conjugations does not exclude the presence of other elements or steps than those listed and the word 'a' or 'an' preceding an element does not exclude the presence of a plurality of such elements, that any reference signs do not limit the scope of the claims, that the invention and every unit or means mentioned may be implemented by suitable hardware and/or software and that several 'means' or 'units' may be represented by the same item. Further, the scope of the invention is not limited to the embodiments, and the invention lies in each and every novel feature or combination of features described above.

The invention claimed is:

1. A method of extracting metadata from a document image of pixels, the pixels having a value representing the intensity and/or color of a picture element, the method comprising:
    displaying at least part of the image on a display screen for a user;
    receiving a selection command from a user, the selection command including an indication of a selection point in a metadata element in the image;
    automatically classifying pixels as foreground pixels based on their values having a foreground property;
    automatically determining an extraction area within the image in accordance with the selection command by:
        setting a connection distance;
        automatically selecting a first foreground pixel based on the selection point; and
        starting from the first foreground pixel, automatically building up a connected region of foreground pixels by progressively including any foreground pixel that is within the pre-set connection distance apart from the first foreground pixel or any other foreground pixel already included in the connected region until no further foreground pixel is within the pre-set connection distance apart from any foreground pixel already included in the connected region; and
    extracting the metadata by processing pixels in the extraction area.

2. The method as claimed in claim 1, wherein the connection distance is set in dependence of a connection direction, the connection direction being a horizontal direction, a vertical direction or an assumed reading direction.

3. The method as claimed in claim 1, wherein the input document image is converted to a lower resolution and the steps of automatically classifying the pixels and of automatically determining the extraction area are performed on the lower resolution image.

4. The method as claimed in claim 1, wherein the step of automatically determining the extraction area includes displaying a proposed extraction area.

5. The method as claimed in claim 4, wherein the step of automatically determining the extraction area further includes adjusting the proposed extraction area on a user command.

6. The method as claimed in claim 5, further comprising:
    providing controllable elements of the proposed extraction area, said user command including moving one of the controllable elements.

7. The method as claimed in claim 5, wherein the step of adjusting the proposed extraction area comprises increasing or decreasing the size of the extraction area via a supplementary user control event.

8. The method as claimed in claim 7, wherein the supplementary user control event includes at least one of the following:
    clicking a mouse button, and
    operating a mouse wheel.

9. The method as claimed in claim 1, further comprising:
    receiving a supplement to the selection command, for adapting the connection distance.

10. The method as claimed in claim 9, further comprising:
    automatically adapting the connection distance in response to the supplement to the selection command, wherein the supplement to the selection command comprises the user indicating a further selection point.

11. The method as claimed in claim 10, further comprising:
    automatically adapting the connection distance in dependence of a selection direction received via the supplement to the selection command, said selection direction being defined by the user dragging a selection item on the display screen.

12. The method as claimed in claim 1, wherein the selection command comprises a supplement to the selection command for assigning a metadata type to the extracted metadata.

13. The method as claimed in claim 12, wherein the extracted metadata and assigned types are entered into a database as indexing data for a document.

14. The method as claimed in claim 1, further comprising:
    extracting as metadata a text string; and
    assigning the text string to constitute a file name for a file or a subject name for an e-mail message containing the image.

15. The method as claimed in claim 1, wherein the pre-set connection distance in a horizontal direction is different from the pre-set connection distance in a vertical direction.

16. The method as claimed in claim 1, wherein the step of automatically determining the extraction area within the image is initiated using the selection command from the user that includes the indication of a single selection point without using any selection command that includes an indication of any other selection point in the metadata element in the image.

17. A device for extracting metadata from a document image of pixels, the pixels having a value representing the intensity and/or color of a picture element, the device comprising:
    an input unit for receiving the image;
    a display for displaying at least part of the image for a user;
    a user interface for receiving a selection command from the user, the selection command comprising a selection point in a metadata element in the image; and
    a processing unit for
        automatically classifying pixels as foreground pixels based on the values having a foreground property,
        automatically determining an extraction area within the image in accordance with the selection command by:
            setting a connection distance;

automatically selecting a first foreground pixel based on the selection point; and starting from the first foreground pixel;

automatically building up a connected region of foreground pixels by progressively including any foreground pixel that is within the pre-set connection distance apart from the first foreground pixel or any other foreground pixel already included in the connected region until no further foreground pixel is within the pre-set connection distance apart from any foreground pixel already included in the connected region, and extracting the metadata by processing pixels in the extraction area.

18. The device as claimed in claim 17, wherein the processing unit is adapted for setting the connection distance in dependence of a connection direction, the connection direction being a horizontal direction, a vertical direction or an assumed reading direction.

19. The device as claimed in claim 17, wherein the processing unit is adapted for converting the input document image to a lower resolution and for performing the classifying of pixels and determining of an extraction area on the lower resolution image.

20. The device as claimed in claim 17, wherein the processing unit is adapted for determining the extraction area by displaying a proposed extraction area on the display.

21. The device as claimed in claim 20, wherein the processing unit further adjusts the shape of the proposed extraction area on a user command.

22. The device as claimed in claim 21, wherein the processing unit provides the proposed extraction area on the display with controllable elements for allowing the user to adjust the shape of the proposed extraction area.

23. The device as claimed in claim 21, wherein the processing unit increases or decreases the size of the extraction area in reaction to a supplementary user control event.

24. The device as claimed in claim 17, wherein the processing unit is adapted for receiving a supplement to the selection command for adapting the connection distance.

25. The device as claimed in claim 24, wherein the processing unit adapts the connection distance in response to the supplement to the selection command, the supplement being a further selection point indicated by the user.

26. The device as claimed in claim 25, wherein the processing unit adapts the connection distance in dependence of a selection direction received via the supplement to the selection command, said selection direction being defined by the user dragging a selection item on the display.

27. The device as claimed in claim 17, wherein the user interface is adapted for receiving a supplement to the selection command for assigning a type of metadata to the extracted metadata.

28. The device as claimed in claim 27, wherein the processing unit is adapted for entering the extracted metadata and assigned types into a database as indexing data for a document.

29. The device as claimed in claim 17, wherein the processing unit is adapted for extracting as metadata a text string, and for assigning the text string to constitute a file name for the image.

30. The device as claimed in claim 17, wherein operation of automatically determining the extraction area within the image is initiated using the selection command from the user that includes the indication of a single selection point without using any selection command that includes an indication of any other selection point in the metadata element in the image.

31. A non-transitory computer readable medium encoded with a program product, for extracting metadata from a document image of pixels, the pixels having a value representing the intensity and/or color of a picture element, the computer program comprising computer-executable instructions for:

displaying at least part of the image on a display screen for a user;

receiving a selection command from a user, the selection command including an indication of a selection point in a metadata element in the image;

automatically classifying pixels as foreground pixels based on their values having a foreground property;

automatically determining an extraction area within the image in accordance with the selection command by:

setting a connection distance;

automatically selecting a first foreground pixel based on the selection point; and starting from the first foreground pixel, automatically building up a connected region of foreground pixels by progressively including any foreground pixel that is within the pre-set connection distance apart from the first foreground pixel or any other foreground pixel already included in the connected region until no further foreground pixel is within the pre-set connection distance apart from any foreground pixel already included in the connected region; and extracting the metadata by processing pixels in the extraction area.

32. The computer readable medium as claimed in claim 31, wherein the connection distance is set in dependence of a connection direction, the connection direction being a horizontal direction, a vertical direction or an assumed reading direction.

33. The computer readable medium as claimed in claim 31, wherein the computer-executable instructions for automatically determining the extraction area include computer-executable instructions for displaying a proposed extraction area.

34. The computer readable medium as claimed in claim 33, wherein the computer-executable instructions for automatically determining the extraction area further include computer-executable instructions for adjusting the proposed extraction area on a user command.

35. The computer readable medium as claimed in claim 34, wherein the computer-executable instructions for adjusting the proposed extraction area comprise computer-executable instructions for increasing or decreasing the size of the extraction area via a supplementary user control event.

36. The computer readable medium as claimed in claim 31, wherein the computer program further comprises computer-executable instructions for:

automatically adapting the connection distance in response to a supplement to the selection command, wherein the supplement to the selection command comprises the user indicating a further selection point.

37. The computer readable medium as claimed in claim 36, wherein the computer program further comprises computer-executable instructions for:

automatically adapting the connection distance in dependence of a selection direction received via the supplement to the selection command, said selection direction being defined by the user dragging a selection item on the display screen.

38. The computer readable medium as claimed in claim 31, wherein the computer program further comprises computer-executable instructions for:

extracting as metadata a text string; and assigning the text string to constitute a file name for a file or a subject name for an e-mail message containing the image.

39. The computer readable medium as claimed in claim 31, wherein the computer-executable instructions for automatically determining the extraction area within the image are initiated using the selection command from the user that includes the indication of a single selection point without using any selection command that includes an indication of any other selection point in the metadata element in the image.

\* \* \* \* \*